United States Patent [19]

Adams et al.

[11] 4,264,067
[45] Apr. 28, 1981

[54] DUPLEXING AUTO DOCUMENT FEED FOR COPYING MACHINE

[75] Inventors: Gerald M. Adams, Fayetteville, N.Y.; Takao Suzuki, Caldwell, N.J.; Yutaka Koizumi, Kawasaki, Japan

[73] Assignee: Ricoh Co., Ltd., Tokyo, Japan

[21] Appl. No.: 23,464

[22] Filed: Mar. 23, 1979

[30] Foreign Application Priority Data

Mar. 31, 1978 [JP] Japan .................................. 53/37951

[51] Int. Cl.³ .......................... B65H 5/26; B65H 5/02
[52] U.S. Cl. .......................................... 271/4; 271/9; 271/186; 271/303; 271/DIG. 9; 355/3 SH; 355/23
[58] Field of Search .................. 271/4, 9, 65, 186, 3.1, 271/245, 246, DIG. 9, 213, 303; 355/3 SH, 14 SH, 23, 24, 25, 26

[56] References Cited

U.S. PATENT DOCUMENTS

| | | | |
|---|---|---|---|
| 3,227,444 | 1/1966 | Egan | 271/65 |
| 3,597,076 | 8/1971 | Hubbard et al. | 271/4 X |
| 3,614,088 | 10/1971 | Watson | 271/213 X |
| 3,747,918 | 7/1973 | Margulis et al. | 271/4 |
| 3,999,852 | 12/1976 | Katayama et al. | 271/DIG. 9 X |
| 4,062,533 | 12/1977 | Greenberg et al. | 271/9 X |

OTHER PUBLICATIONS

Bullock, M. K. "Duplex Document Feeder", *IBM Tech. Disc. Bulletin* vol. 19, No. 12, May 1977, p. 4496.

*Primary Examiner*—Bruce H. Stoner Jr.
*Attorney, Agent, or Firm*—David G. Alexander

[57] ABSTRACT

A conveyor belt (14) conveys a document (19), (32) over a transparent glass platen (10) to a scanning position. An automatic document feed unit (22), (26) feeds documents (19) from a stack one by one between the lower run of the belt (14) and the platen (10) for conveyance over the platen (10). A manual feed unit (34) feeds documents (32) manually inserted thereinto one by one onto the upper run of the belt (14) from which the documents (32) are guided downwardly over an end of the belt (14) between the lower run of the belt (14) and the platen (10) for conveyance over the platen (10). The relative positions of the automatic and manual feed units (22), (26); (34) may be reversed. The documents (19), (32) are discharged by the belt (14) onto a tray (54) after scanning. An inverting unit which includes an endless belt (43) or an inclined plate (86) is utilized where it is desired to turn the documents (19), (32) over and feed them over the platen (10) upside down to the scanning position to scan the opposite sides thereof.

13 Claims, 5 Drawing Figures

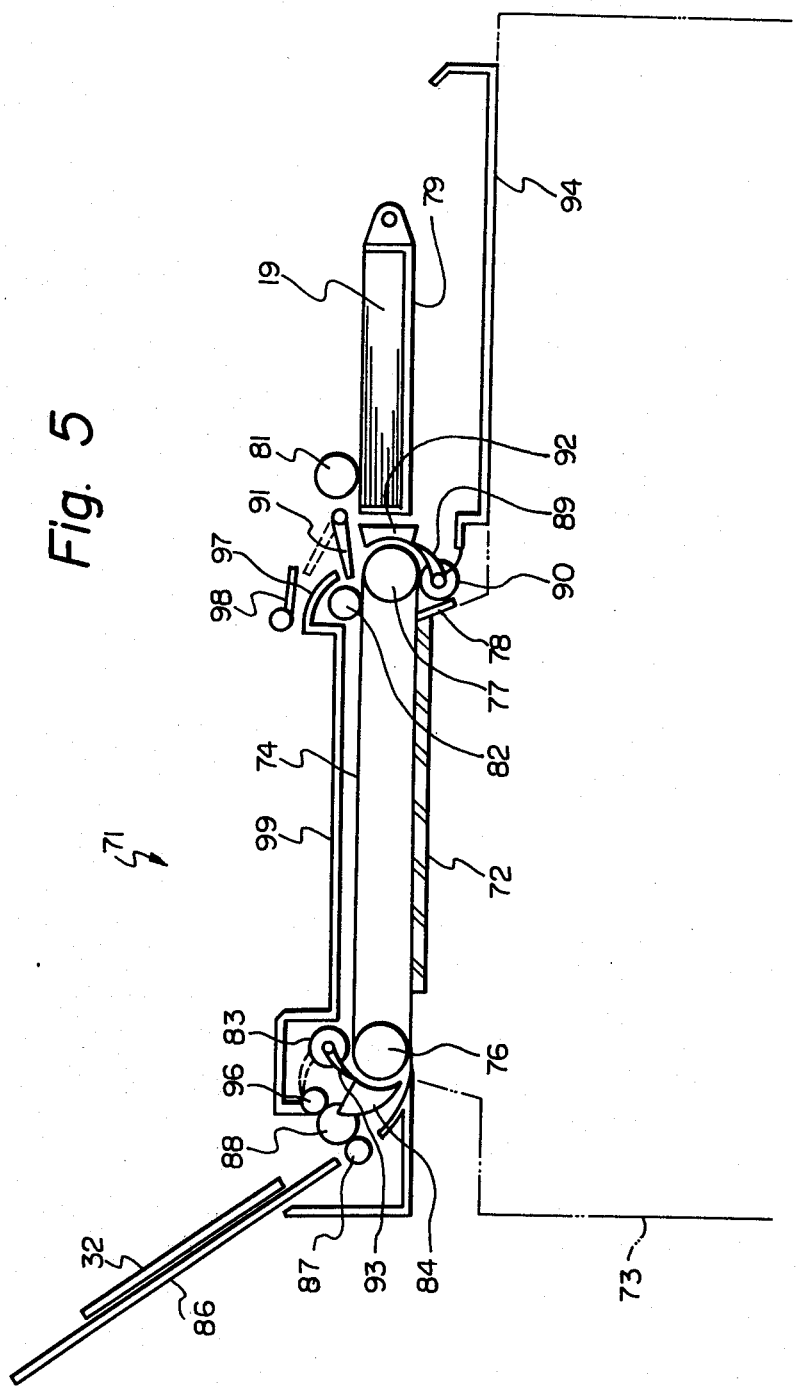

DUPLEXING AUTO DOCUMENT FEED FOR COPYING MACHINE

BACKGROUND OF THE INVENTION

The present invention relates to an apparatus for feeding documents into a scanning position on a platen of an electrostatic copying machine for scanning and discharging the documents after scanning.

Conventional electrostatic copying machines comprise a glass platen on which an original document is placed face down for scanning. A light image of the document is radiated onto an electrostatically charged photoconductive drum to form an electrostatic image. A toner is applied to the drum to form a toner image through electrostatic attraction. The toner image is transferred and fixed to a sheet of copy paper to provide a permanent reproduction of the original document. A presser plate or cover is provided which is raised to place the document on the platen and lowered onto the document to press the same against the platen for scanning.

Although this conventional arrangement is effective for copying bulky documents such as pages of bound books, it is inconvenient and slow for copying a number of sheet documents, especially where the documents are the same size. This is because it takes a considerable amount of time to raise the presser plate, remove a previous document, it any, place a new document on the platen and lower the presser plate onto the new document.

To speed up copying operations of a number of sheet documents, various automatic document feed systems have been developed and placed into practical application. There are generally two types of automatic feed systems. In the first type the documents are placed in a stack on a tray and automatically fed therefrom one by one onto the platen and discharged after scanning. In the second system the documents are manually fed one by one into a feed unit which feeds them to the platen for scanning and subsequent discharge.

The first system is advantageous where the documents are all of the same size and of medium thickness. However, where different sized documents or thick or thin documents are fed through such a device, various malfunctions such as failure to feed, feeding of more than one document at one time, jamming and tearing are common. Large documents which are expensive often jam, crease or tear while being fed through such a device.

While these drawbacks are overcome in the second type of system, the latter is inferior where it is desired to copy a large number of documents of the same size and medium thickness since the operation of manually inserting the documents into the feed unit one by one is quite slow compared to completely automatic feed.

SUMMARY OF THE INVENTION

A document feed apparatus embodying the present invention includes a transparent platen and conveyor means disposed above the platen for conveying a document across the platen a stack support member, automatic feed means for automatically feeding documents from a stack of documents supported by the stack support member one by one to the conveyor means, and manual feed means for feeding a document manually inserted into the manual feed means to the conveyor means.

In accordance with the present invention, a conveyor belt conveys a document over a transparent glass platen to a scanning position. An automatic document feed unit feeds document froms a stack one by one between the lower run of the belt and the platen for conveyance over the platen. A manual feed unit feeds documents manually inserted thereinto one by one onto the upper run of the belt from which the documents are guided downwardly over an end of the belt between the lower run of the belt and the platen for conveyance over the platen. The relative positions of the automatic and manual feed units may be reversed. The documents are discharged by the belt onto a tray after scanning. An inverting unit which includes an endless belt or an inclined plate is utilized where it is desired to turn the documents over and feed them over the platen upside down to the scanning position to scan the opposite sides thereof.

It is an object of the present invention to provide a duplexing auto document feed for an electrostatic copying machine which overcomes the drawbacks of the prior art and enables copying of all types of documents with maximum speed and safety.

It is another object of the present invention to provide a document feed apparatus for a copying machine which comprises an automatic feed means for feeding documents from a stack, a manual feed means for feeding documents inserted manually and inverting means for inverting documents fed either automatically or manually for copying both sides thereof.

It is another object of the present invention to eliminate malfunctions such as feed failures, multiple feeding, jams and tearing in an automatic document feed apparatus for a copying machine.

It is another object of the present invention to provide a generally improved duplexing auto document feed for a copying machine.

Other objects, together with the foregoing, are attained in the embodiments described in the following description and illustrated in the accompanying drawing.

BRIEF DESCRIPTION OF THE DRAWING

FIG. 5 is a schematic side elevation of a third duplexing auto document feed apparatus embodying the present invention.

DESCRIPTION OF THE PREFERRED EMBODIMENTS

While the duplexing auto document feed apparatus for an electrostatic copying machine of the present invention is susceptible of numerous physical embodiments, depending upon the environment and requirements of use, sustantial numbers of the herein shown and described embodiments have been made, tested and used, and all have performed in an eminently satisfactory manner.

Figure 1:
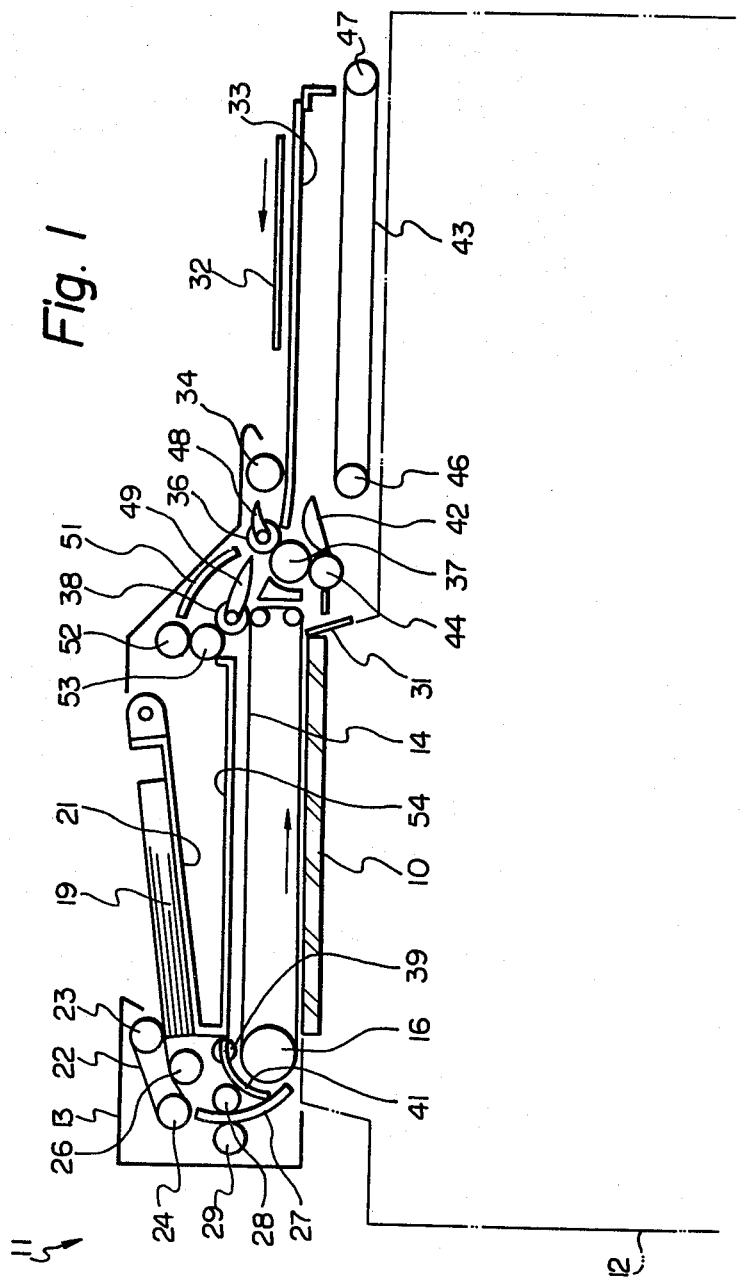
FIG. 1 is a schematic side elevation of a duplexing auto document feed apparatus embodying the present invention mounted on an electrostatic copying machine in a single side copy mode.

Referring now to FIG. 1 of the drawing, a duplexing auto document feed apparatus is generally designated by the reference numeral 11 and is mounted on an electrostatic copying machine 12. A transparent glass platen 10 is horizontally disposed and adapted to support original documents face down for scanning by an optical system (not shown) of the copying machine 12. The apparatus 11 comprises a housing 13 in which is provided an endless conveyor belt 14. The belt 14 is trained around rollers 16, 17 and 18 for counterclockwise rotation over the platen 10.

A stack of original documents 19 for electrostatic copying are placed face up on a tray 21. An endless feed belt 22 is trained around rollers 23 and 24 and rotated clockwise when driven to feed the documents 19 to the conveyor belt 14 one by one. The right end portion of the belt 22 engages with the top document 19 and feeds the same leftwardly. A roller 26 is pressed against the lower run of the belt 22 and rotated clockwise at a surface speed which is much slower than that of the belt 22. The roller 26 urges the document 19 rightwardly against the action of the belt 22. The purpose of the roller 26 is to prevent feeding of two documents 19 at once by preventing a lower of the two documents 19 from being fed by the belt 22.

A document 19 fed from the tray 21 by the belt 22 is guided downwardly by a guide 27 and fed by rollers 28 and 29 onto the platen 10 below the bottom or lower run of the belt 14. The belt 14 feeds the document 19 rightwardly over the platen 10 into abutting engagement with an elongated stop 31 which is temporarily raised into pressing engagement with the belt 14. The rotation of the belt 14 is stopped a short time after the document 19 engages with the stop 31. In this manner the document 19 is held in a scanning or exposure position face down on the platen 10.

In accordance with the present invention a document 32 may be manually slid face up over a tray 33 into the bite of a feed roller 34 which feeds the document 32 into the bite of feed rollers 36 and 37. The rollers 36 and 37 feed the document 32 onto the upper run of the belt 14. A roller 38 engaging with the portion of the belt 14 trained around the roller 18 feeds the document 32 onto the upper run of the belt 14.

The document 32 is carried leftwardly by the belt 14 to a roller 39 which engages with the portion of the belt 14 trained around the roller 16. The roller 39 feeds the document 32 downwardly around the left end of the belt 14 which is trained around the roller 16 between the lower run of the belt 14 and the platen 10. A guide 41 guides the document 32 around the roller 16. The lower run of the belt 14 thereafter feeds the document 32 across the platen 10 into engagement with stop 31.

It will be understand from the above description that a document 19 from the stack on the tray 21 or a document 32 on the tray 33 may be fed to the scanning position in engagement with the stop 31 by the belt 14 in accordance with the present invention. The document 19 is fed directly between the lower run of the belt 14 and the platen 10. The document 32 is fed onto the upper run of the belt 14, carried thereby to the guide 41 and guided around the guide 41 between the lower run of the belt 14 and the platen 10. This duplex feed mode operation is an important feature of the present invention.

For purposes of further description, it will be assumed that the document 19 has been fed to the scanning position. The operations which will be described below are identical in a case in which the document 32 has been fed to the scanning position.

In a case in which the document 19 has information on only one side thereof which is to be copied, the stop 31 is retracted below the level of the platen 10 after the scanning exposure, the belt 14 driven for rotation and the document 10 fed thereby off the platen 10 over a guide 42 onto an inverter endless belt 43. A roller 44 cooperates with the roller 37 in feeding the document 19 onto the belt 43. The belt 43 is trained around rollers 46 and 47 and held stationary in this copy mode. The belt 43 is maintained at a lower horizontal position as illustrated in FIG. 1. After the copying operation is completed and copies of as many documents 19 or 32 as required are made, the documents 19 or 32 which are stacked automatically on the belt 43 are removed for further use or storage. Although not illustrated in detail, the tray 33 is pivotally mounted to allow it to be raised and permit access to the belt 43 and stacked documents 19 or 32.

The apparatus 11 further comprises a first gate or guide 48 which is pivotally mounted about the same axis as the roller 36, and a gate or guide 49 which is pivotally mounted about the same axis as the roller 38. For the sale side copying operations of the documents 19 or 32 described hereinabove, the gates 48 and 49 are rotated counterclockwise to upper positions as illustrated in FIG. 1. The gate 48 in its upper position allows the document 32 to be fed thereunder from the tray 33 to the belt 14 and also allows the document 19 or 32 to be fed thereunder from the platen 10 to the belt 43.

Figure 2:
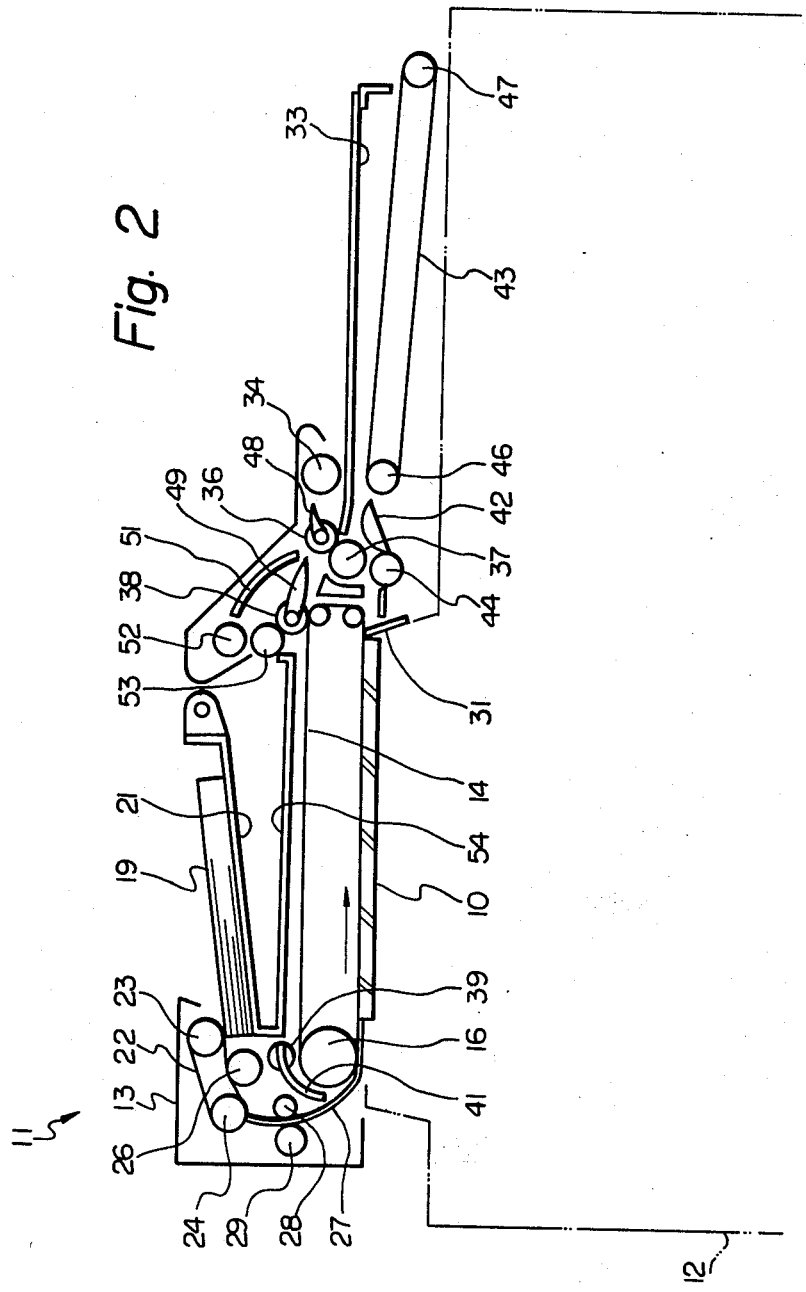
FIG. 2 is similar to FIG. 1 but shows the apparatus in the first stage of a double or two side copy mode.

The guides 48 and 49 allow the apparatus 11 to function so as to copy both sides of a document 19 or 32. As illustrated in FIG. 2 which shows the first stage of the process, the guides 48 and 49 are rotated to their raised positions. The only difference between the status of the apparatus 11 in FIGS. 1 and 2 is that in FIG. 2 the belt 43 is elevated to an inclined position and driven for counterclockwise rotation at a suitably low speed.

As illustrated in FIG. 2 a document 19 or 32 is fed to the scanning position and the front side scanned. Then, the stop 31 is retracted and the document 19 or 32, here assumed to be the document 19, is fed by the rollers 37 and 44 onto the belt 43. Since the belt 43 is driven at a low surface speed compared to the rollers 37 and 44, the document 19 is fed rightwardly onto the belt 43.

As the trailing (left) edge of the document 19 engages the roller 37 it is carried thereby upwardly so that the trailing edge of the document 19 points at the bite of the rollers 37 and 36. The belt 43 feeds the document 19 leftwardly over the guide 42 into the bite of the rollers 36 and 37 which feed the document 19 under the guides 48 and 49 onto the upper run of the belt 14. The belt 14 conveys the document 19 leftwardly to the roller 16 around which it is guided between the lower run of the belt 14 and the platen 10. The belt 14 then conveys the document 19 leftwardly to the stop 31 which is again raised to hold the document 19 in the scanning position.

It will be understood that as the result of this operation the document 19 is inverted or turned upside down so that the back side thereof faces downwardly on the platen 10. The back side of the document 19 is scanned for copying.

Figure 3:
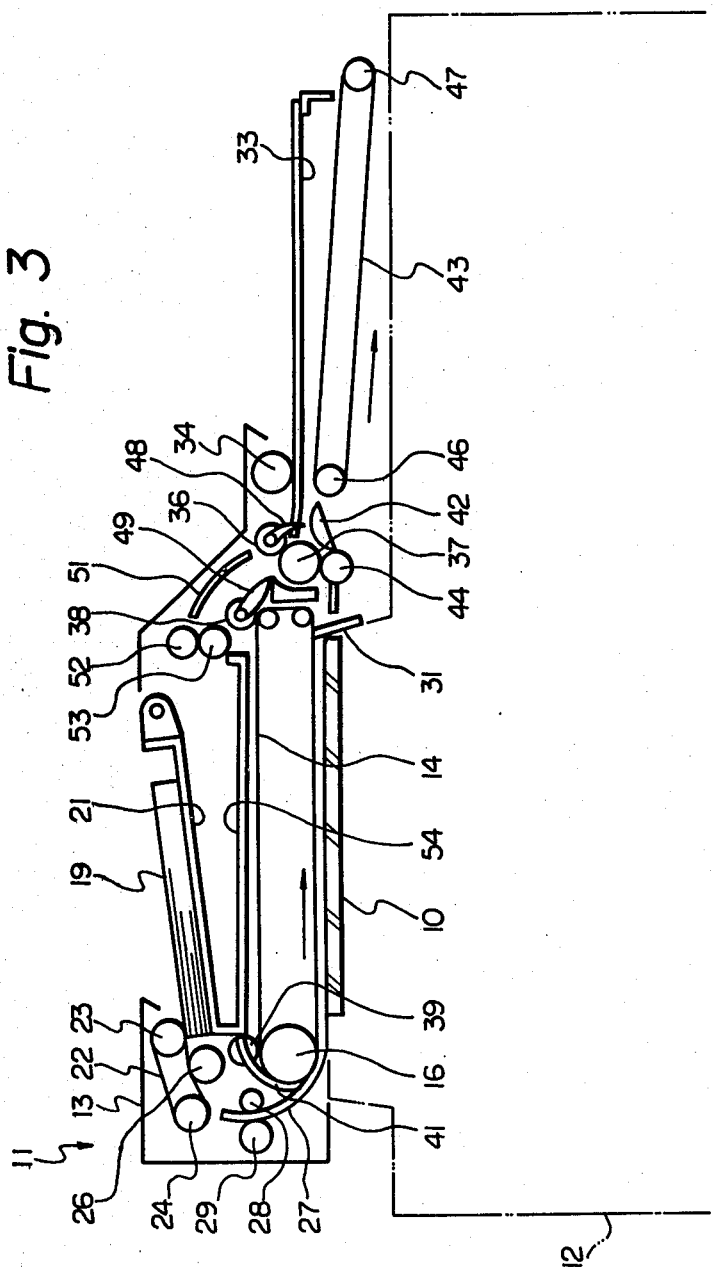
FIG. 3 is also similar to FIG. 1 but shows the apparatus in the second stage of a double side copy mode.

After scanning of the back side of the document 19, the guides 48 and 49 are rotated clockwise to their lower positions as illustrated in FIG. 3. The stop 31 is retracted and the belt 14 rotated to feed the document 19 off the platen 10. In this case, however, the document 19 as fed by the rollers 37 and 44 is guided by the guide 48 upwardly into the bite of the rollers 36 and 37 rather than being fed onto the belt 43. The document is fed over the guide 49 and under a guide 51 into the bite of feed rollers 52 and 53 which feed the document 19 into a receiving tray 54 disposed under the tray 21. After the copying operation is completed the tray 21 is pivotally moved upwardly to allow acess to the tray 54 for removal of the documents 19. It will be understood that the guides 48 and 49 are moved to the upper positions of FIG. 2 prior to feeding another document 19 or 32 to the platen 10 for copying to allow the documents 32 to clear and guide 48.

The apparatus 11 may be modified to operate in various ways. For example, the tray 33 may be rigidly mounted and the tray 54 used to receive documents 19 or 32 during a single side copying operation. This is accomplished by initially rotating the guides 48 and 49 to their upper positions as shown in FIG. 1 or 2 and rotating them to their lower positions of FIG. 3 after the document 19 or 32 is fed onto the platen 10. Where a changeover switch (not shown) is provided to select between automatic feed or manual feed and it is changed over to select automatic feeding of documents 19 from the tray 21, the guides 48 and 49 may be left in their lower position of FIG. 3 during the entire copying operation. Preferably the belt 43 is stopped in order to save energy since it is not used. This latter case is possible since it is not necessary to raise the guide 48 in order to enable the document 32 to pass thereunder.

Figure 4:
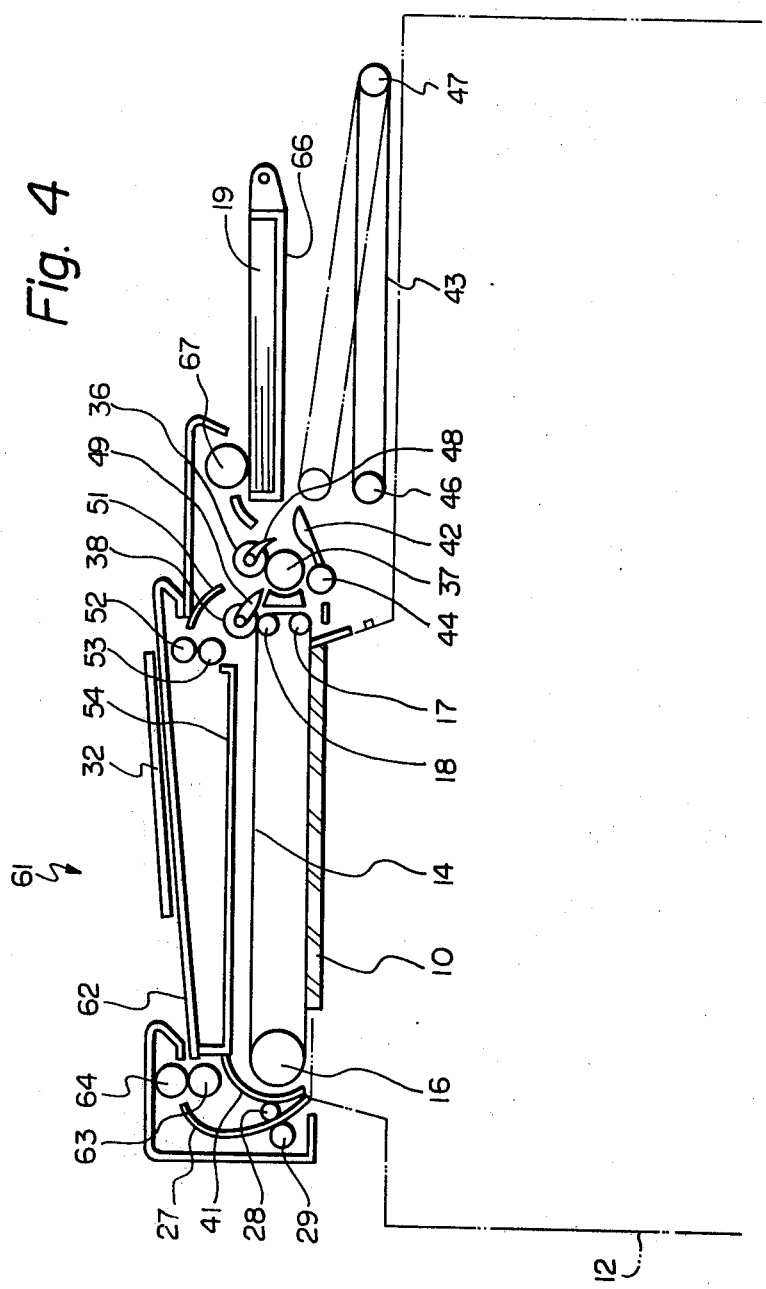
FIG. 4 is schematic side elevation of a second duplexing auto document feed apparatus embodying the present invention.

FIG. 4 illustrates another embodiment of the present invention which is designated as 61. Like elements are designated by the same reference numerals used in FIGS. 1 to 3.

The apparatus 61 differs from the apparatus 11 in that the positions of the automatic feed unit and the manual feed unit are reversed. The apparatus 61 comprises a tray 62 over which a document 32 is slid manually in the leftward direction in to the bite of rollers 63 and 64 which convey the document 32 between the lower run of the belt 14 and the platen 10. A roller 67 feed documents 19 from a stack on a tray 66 into the bite of the rollers 36 and 37 with the guides 48 and 49 in their upper positions. The rollers 36 and 37 feed the documents 19 onto the upper run of the belt 14 in the same manner as they feed the document 32 in te apparatus 11. It will be seen that a document 19 is automatically fed between the lower run of the belt 14 and the platen 10 in teh apparatus 11 but fed onto the upper run of the belt 14 in the apparatus 61. A document 32 is manually fed onto the upper run of the belt 14 in the apparatus 11 but fed between the lower run of the belt 14 and the platen 10 in the apparatus 61.

FIG. 5 illustrates another apparatus 71 embodying the present invention in which the function of inverting a document 19 or 32 for scanning the back side thereof is provided by an inclined plate rather than a belt. The plate also functions as a guide or support for manually feeding documents 32 into the apparatus 71. The apparatus 71 comprises a transparent glass platen 72 mounted on top of a copying machine 73. An endless conveyor belt 74 is trained around rollers 76 and 77 for counterclockwise rotation above the platen 72. A stop 78 is movably mounted adjacent to the platen 72 which provides the same function as the stop 31.

Documents 19 are stacked on a tray 79 and fed therefrom one by one onto the upper run of the belt 74 by a feed roller 81. The document 19 is fed leftwardly by the belt 74 in combination with a feed roller 82 into the bite of a roller 83 which engages with the portion of the belt 74 which is trained around the roller 76. The document 19 is guided downwardly around the roller 76 by a guide 84 between the lower run of the belt 74 and the platen 72 and conveyed by the lower run of the belt 74 into engagement with the stop 78.

Where it is desired to insert a document 32 manually for copying the document 32 is slid down an inclined plate 86 which also functions as an inverting means into the bite of feed rollers 87 and 88 which feed the document 32 between the lower run of the belt 74 and the platen 72 for conveyance to the stop 78.

The apparatus 71 further comprises a guide or gate 89 which is pivotally mounted about the same axis as a roller 90 which engages with the portion of the belt 74 trained around the roller 77. A guide or gate 91 is pivotally mounted above a guide 92 which is provided at the right end of the belt. Another guide or gate 93 is pivotally mounted about the same axis as the roller 83.

For feeding a document 19 from the tray 79 to the scanning position, the positions of the guides 89 and 91 are irrelevant but the guide 93 must be moved to a lower solid line position in order to guide the document 19 to the guide 84. The positions of all of the guides 89, 91 and 93 are irrelevant for feeding a document 32 to the scanning position.

For copying only a single side of a document 19 or 32, the guide 89 is moved to a lower position. When the stop 78 is retracted and the belt 74 driven, the document 19 or 32 is fed by the belt 74 and roller 90 over the guide 91 into a receiving tray 94.

For copying both sides of a document 19 or 32, the document 19 or 32 is moved to the scanning position as described hereinabove for scanning of the front side. the guide 91 is moved to an upper position as illustrated in phantom line. The guide 91 is moved to a lower position as illustrated in solid line. The guide 93 is moved to an upper position as illustrated in phantom line.

After scanning, the belt 14 and roller 90 feed the document 19 or 32, for example the document 19, upwardly over the guide 89, around the guide 92, under the guide 91 into the bite of the roller 82 which feeds the document 19 leftwardly in conjunction with the upper run of the belt 74. The rollers 76 and 83 feed the document 19 under the guide 93 into the bite of the roller 88 and a roller 96 which in turn feed the document 19 onto the tray 86.

As the trailing (right) edge of the document 19 moves around the roller 88 it is urged by gravity into the bite of the rollers 88 and 87. The rollers 87 and 88 feed the document 19 downwardly and rightwardly between the lower run of the belt 74 and platen 72 for conveyance to the scanning position. It will be noted that this operation has the effect of turning the document 19 upside down The document 19 is stopped by the stop 78 and scanned again to copy the back side thereof. Then, the stop 78 is retracted and the belt 74 driven to feed the document 19 off the platen 72.

In this case, regardless of whether the document is constituted by the document 19 or the document 32, the guide 89 is maintained in its upper position and the guide 91 is rotated to an upper phantom line position. The document 19 is fed by the belt 74 and roller 90 upwardly over the guide 89 and around the guide 92. The document 19 is fed under the guide 91 and between guides 97 and 98 into a receiving tray 99 which is disposed above the belt 74. It will thus be seen that the documents for single side copying are received in the tray 94 whereas the documents for both side copying are received in the tray 99.

It is possible within the scope of the present invention to eliminate the tray 94 and feed the documents into the tray 99 under all conditions. Where this is desired the guide 89 is replaced by a fixed guide (not shown) which guides the documents in the same manner as the guide 89 in the upper solid line position. The guide 91 is operated in the manner described above for two side copying.

It is also possible to eliminate the tray 99 and feed documents into the tray 94 under all conditions. In such a case the guide 91 is replaced by a fixed guide (not shown) which guides all documents onto the belt 74 in the same manner as the guide 91 in the lower solid line position. The guide 89 may be maintained in the lower position at all times for one side copying. For double side copying the guide 89 is initially moved to the upper position for guiding the document 19 or 32 onto the upper run of the belt 74 and subsequently the plate 86 for inversion. After scanning of the back side of the document 19 or 32 the guide 89 is moved to the lower position to allow the document 19 or 32 to be discharged onto the tray 94.

In summary, it will be seen that the present invention provides a duplexing auto feed for a copying machine which overcomes the drawbacks of the prior art and allows copies of all types of documents to be made at maximum speed and with maximum safety. Various modifications will become possible for those skilled in the art after receiving the teachings of the present disclosure without departing from the scope thereof. For example, the entire document feed apparatus may be pivotally mounted on the copying machine in such a manner as to allow the feed apparatus to be pivoted upwardly away from the platen. This will allow bulky documents such as books to be manually placed directly on the platen for copying. In the case, the feed apparatus is maintained inoperative.

What is claimed is:

1. A document feed apparatus including a transparent platen and conveyor means disposed above the platen for conveying a document across the platen, characterized by comprising:
    a stack support member;
    automatic feed means for automatically feeding documents from a stack of documents supported by the stack support member one by one to the conveyor means; and
    manual feed means for feeding a document manually inserted into the manual feed means to the conveyor means;
    the conveyor means comprising a conveyor endless belt, one of the automatic feed means and the manual feed means feeding documents onto an upper run of the conveyor belt, the other of the automatic feed means and the manual feed means feeding documents between a lower run of the conveyor belt and the platen;
    the conveyor means further comprising first and second rollers disposed at opposite ends of the conveyor belt around which the conveyor belt is trained, documents fed by said one of the automatic feed means and the manual feed means onto the upper run of the conveyor belt being conveyed by the upper run of the conveyor belt from the first roller to the second roller, documents fed from said other of the automatic feed means and the manual feed means between the lower run of the conveyor belt and the platen being conveyed by the lower run of the conveyor belt over the platen from the second roller to the first roller, the apparatus further comprising guide means for guiding documents downwardly from the upper run of the conveyor belt around the second roller to between the lower run of the conveyor belt and the platen.

2. An apparatus as in claim 1, further comprising a receiving member for receiving documents conveyed across the platen by the conveyor means and discharged onto the receiving member.

3. An apparatus as in claim 1, further comprising inverting means for receiving a document discharged by the conveyor means and feeding the document back to the conveyor means for conveyance by the conveyor means over the platen upside down.

4. An aparatus as in claim 3, in which the inverting means comprises an endless belt.

5. An apparatus as in claim 3, in which the inverting means comprises an inclined plate.

6. An apparatus as in claim 3, in which the inverting means comprises an inverter endless belt for receiving documents discharged from between the lower run of the conveyor belt and the platen and feeding the documents onto the upper run of the conveyor belt.

7. An apparatus as in claim 6, in which the inverter belt is constructed to constitute a receiving means for receiving documents discharged from the conveyor belt which are not to be inverted, the inverter belt being maintained stationary to function as the receiving means.

8. An apparatus as in claim 6, further comprising a receiving member, the inverting means comprising first guide means movable between a first position for guiding documents discharged by the conveyor belt onto the inverter belt and a second position for guiding documents discharged by the conveyor belt onto the receiving member.

9. An apparatus as in claim 3, in which the inverting means comprises an inclined plate, the guide means guiding documents from the upper run of the conveyor belt onto the plate and from the plate between the lower run of the conveyor belt and the platen.

10. An apparatus as in claim 9, in which the plate is constructed to constitute a guide for guiding documents to the manual feed means.

11. A document feed apparatus including a transparent platen and conveyor means disposed above the platen for conveying a document across the platen, characterized by comprising:
    a stack support member;
    automatic feed means for automatically feeding documents from a stack of documents supported by the stack support member one by one to the conveyor means;
    manual feed means for feeding a document manually inserted into the manual feed means to the conveyor means;
    inverting means for receiving a document discharged by the conveyor means and feeding the document back to the conveyor means for conveyance by the conveyor means over the platen upside down;

the conveyor means comprising a conveyor endless belt, the inverting means comprising an inverter endless belt for receiving documents discharged from between a lower run of the conveyor belt and the platen and feeding the documents onto an upper run of the conveyor belt and guide means for guiding the documents from the upper run of the conveyor belt downwardly around an end of the conveyor belt between the lower run of the conveyor belt and platen;

a receiving member, the inverting means comprising first guide means movable between a first position for guiding documents discharged by the conveyor belt onto the inverter belt and the second position for guiding documents discharged by the conveyor belt onto the receiving member; and second guide means disposed between the first guide means and the receiving member movable between a first position for guiding documents from the first guide means onto the receiving member and a second position for guiding documents from the first guide means onto the upper run of the conveyor belt.

12. A document feed apparatus including a transparent platen and conveyor means disposed above the platen for conveying a document across the platen, characterized by comprising:

a stack support member;

automatic feed means for automatically feeding documents from a stack of documents supported by the stack support member one by one to the conveyor means;

manual feed means for feeding a document manually inserted into the manual feed means to the conveyor means; and inverting means for receiving a document discharged by the conveyor means and feeding the document back to the conveyor means for conveyance by the conveyor means over the platen upside down;

the conveyor means comprising an endless belt, the inverting means comprising an inclined plate and guide means for guiding documents from an upper run of the belt onto the plate and from the plate between a lower run of the belt and the platen;

the plate being constructed to constitute a guide for guiding documents to the manual feed means;

the manual feed means being constructed to feed documents from the plate between the lower run of the belt and the platen, the automatic feed means being constructed to feed documents onto the upper run of the belt, the inverting means comprising first guide means movable between a first position for guiding documents from the upper run of the belt onto the plate and a second position for guiding documents from the upper run of the belt downwardly around an end of the belt between the lower run of the belt and the platen.

13. An apparatus as in claim 12, further comprising a receiving member for receiving documents discharged from between the lower run of the belt and the platen and second guide means disposed between the belt and the receiving member movable between a first position for guiding documents from between the lower run of the belt and the platen onto the receiving member and a second position for guiding documents from between the lower run of the belt and the platen upwardly around an end of the belt onto the upper run of the belt.

* * * * *